Dec. 7, 1926.
L. G. HAMLIN
CANDY CUTTING MACHINE
Filed Feb. 10, 1922    4 Sheets-Sheet 2
1,610,049
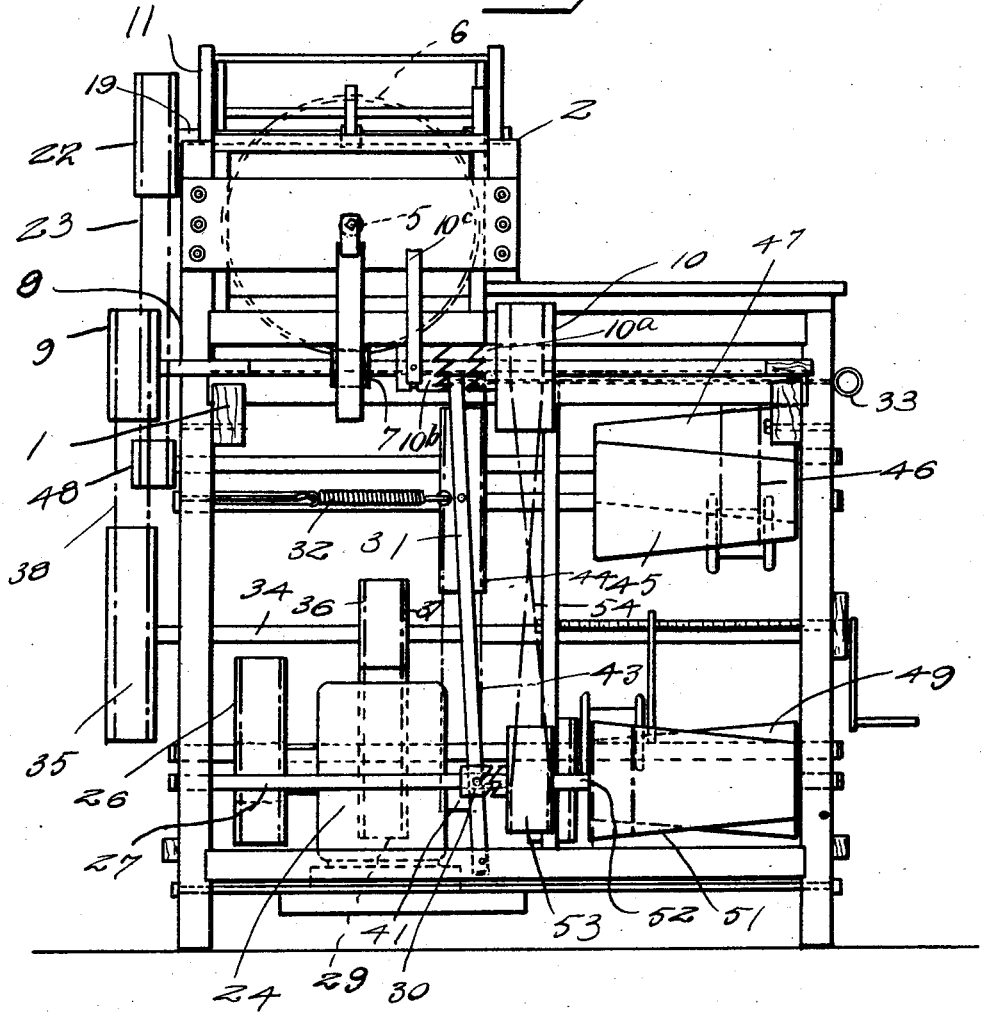
Fig. 2.
Inventor
L.G.Hamlin
Attorney Inventor
L. G. Hamlin Dec. 7, 1926.
L. G. HAMLIN
1,610,049
CANDY CUTTING MACHINE
Filed Feb. 10, 1922    4 Sheets-Sheet 4
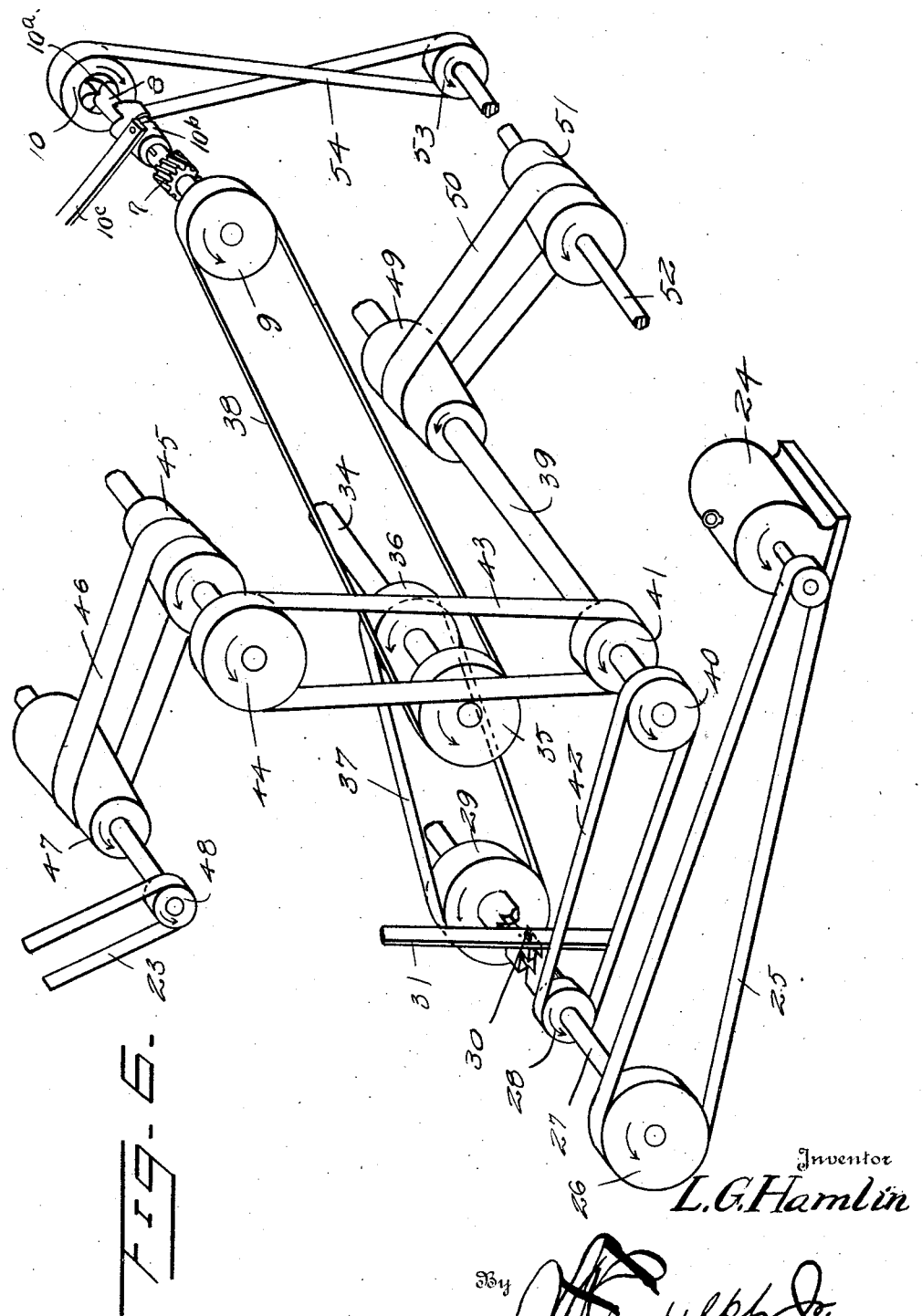

Patented Dec. 7, 1926.

1,610,049

UNITED STATES PATENT OFFICE.

LEON G. HAMLIN, OF MILWAUKEE, WISCONSIN.

CANDY-CUTTING MACHINE.

Application filed February 10, 1922. Serial No. 535,559.

The invention relates to candy machines and more particularly to a machine embodying a mold or casing for receiving the filling or other material and having an outlet therefor at one end, a follower operable in the casing for expelling the material therefrom, and a cutting mechanism for severing the material into pieces of required length.

The invention relates more particularly to the cutting mechanism which embodies a pivoted guide, a cutter carried by the guide and movable therewith and having an independent movement across the path of the material issuing from the mold to sever the same into pieces of desired length and the operating means whereby the cutting and feed mechanisms are actuated.

Other objects and advantages will be apparent and suggest themselves as the nature of the invention is understood.

While the drawings illustrate an embodiment of the invention it is to be understood that in adapting the same to meet different conditions and requirements, various changes in the form, proportion and minor details of construction may be resorted to without departing from the nature of the invention.

Referring to the accompanying drawings forming a part of the application,

Figure 2 is a rear view thereof,

Figure 3:
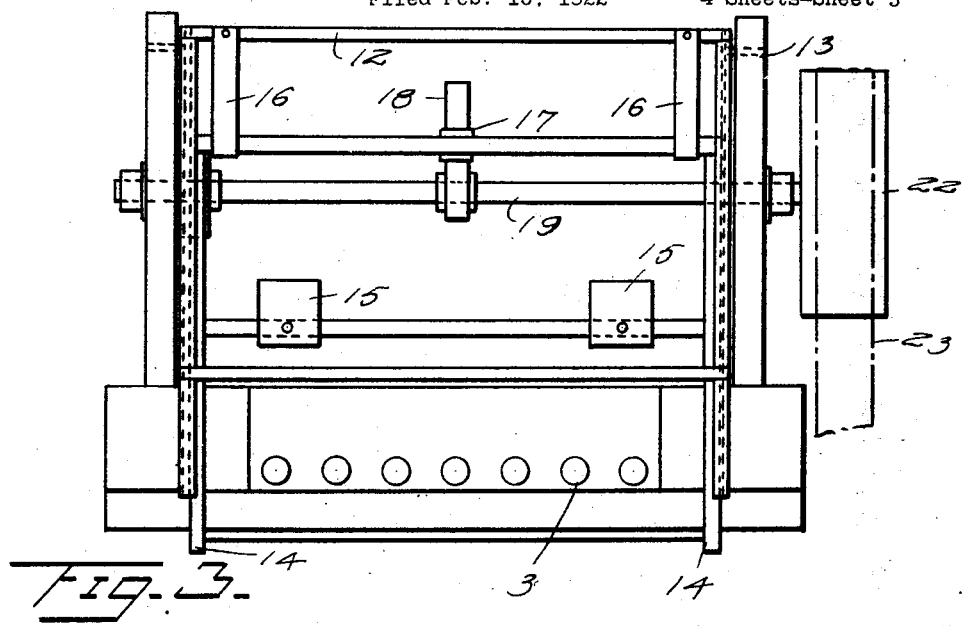
Figure 4:
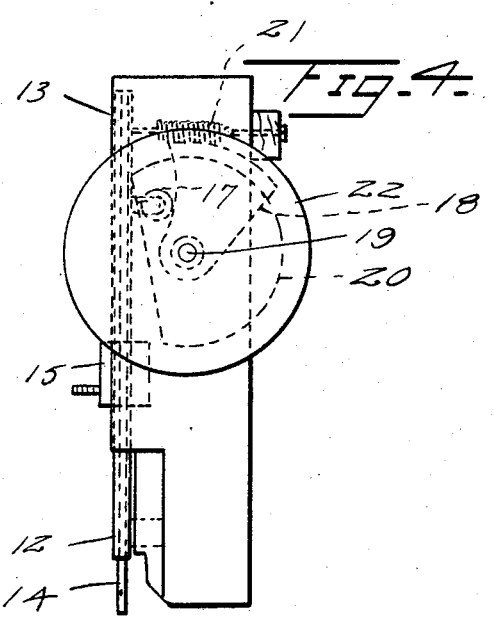
Figure 5:
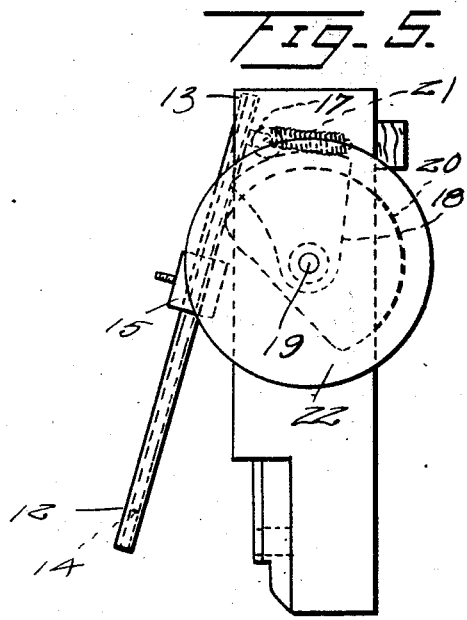

Figure 3 is a front view of the mold and cutting mechanism, showing the parts on a larger scale, Figure 4 is a side view of the parts illustrated in Figure 3, showing the cutter in position immediately after severing the material delivered from the mold, Figure 5 is a view similar to Figure 4, showing the guide swung outward and the cutter elevated, and Figure 6 is a diagrammatic view of the operating mechanism for actuating the cutter and the follower.

Corresponding and like parts are referred to in the following description and designated in the several views of the drawings by like reference characters.

The machine embodies a suitable frame 1 for receiving and supporting the operating parts. A horizontally disposed mold for receiving the cream or other material is arranged at the top of the frame 1 and comprises a casing 2 having an outlet 3 at one end for the delivery of the material which is severed into lengths the required size by a cutting mechanism. The casing 2 may be of any capacity and construction and contains a follower 4 which operates to expel the material from the casing. An externally threaded shaft 5 is connected with the follower 4 and extends through the casing 2 and cooperates with a nut 6 whereby to advance the follower and positively feed the material to the cutting mechanism. The nut 6 is located in the rear of the mold or casing 2 and appears as a worm wheel which is mounted to rotate freely but held against forward or backward movement. A worm 7 cooperates with the worm segments of the nut 6 whereby to effect rotation of the latter. The worm 7 is rotatable with a shaft 8 which is adapted to receive a forward and a reverse movement to effect an advance of the follower 4 or a quick return of the same to normal position. Belt pulleys 9 and 10 are, respectively, fast and loose on the shaft 8, the former receiving a forward movement and the latter a reverse movement. Pulley 10 has clutch teeth 10$^a$ adapted to be engaged at times by a clutch 10$^b$ slidable on and rotatable with shaft 8 under control of a shifting means 10$^c$.

Figure 1:
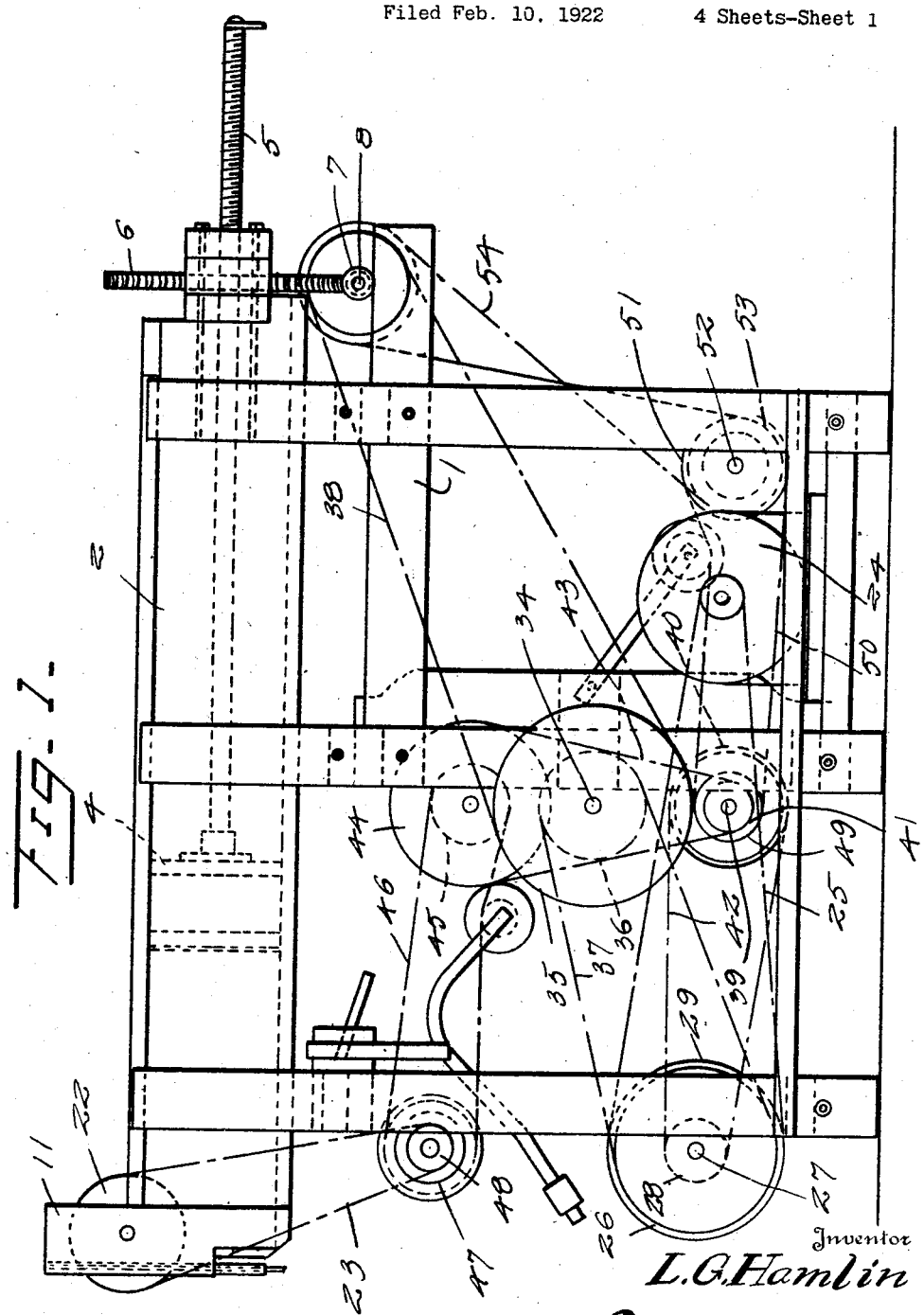
Figure 1 is an elevation of a candy cutting machine embodying the invention.

The mold or casing is provided at its delivery end with a head which embodies uprights 11. A guide 12 is pivoted at its upper end to the uprights 11, as indicated at 13, and is free to swing outwardly at its lower end. A cutting mechanism 14 is slidably mounted in the guide 12 to move therewith and has an independent movement across the path of the material issuing from the mold to sever the same into pieces of required size. Weights 15 are applied to the frame of the cutting mechanism and serve to actuate the same when released from the lifting mechanism. Stop means 16 limit the downward movement of the cutting mechanism and prevent its disengagement from the guide 12. A roller 17, carried by the frame of the cutting mechanism 14, cooperates with a cam 18 fixed to a transverse shaft 19, whereby to effect a lifting of the cutting mechanism preliminary to its rapid descent to effect a severance of the material delivered through the outlet of the mold or casing. A cam 20, fixed upon the shaft 19, is adapted to cooperate with the guide 12 to effect an outward pivotal movement thereof whereby to prevent the cutting mechanism interfering with the proper feed or discharge of the material from the mold. It is observed that the feed of the material is continuous, whereas the action of the cutting mechanism is intermittent. As soon as the required amount of candy has been fed from the mold, the cam 20 reaches a position to admit of the guide 12 assuming a position so as to lie close against the delivery end of the mold, as indicated most clearly in Figures 1 and 4. As soon as this takes place, or a moment thereafter, the cam 18 clears the roller 17 thereby permitting the cutting mechanism to drop and sever that portion of the candy protruding through the outlet of the mold or casing. When the cutting mechanism reaches the limit of its downward movement, the parts appear as shown most clearly in Figure 4. The cam 20 now comes into play to swing the guide 12 outwardly at its lower end so that the cutting mechanism upon its return or upward stroke will not interfere with the proper feed of the candy for the next operation. The cam 20 is of such formation as to hold the cutting mechanism clear of the candy until the predetermined amount has been fed to form the piece of required size and when this takes place, the cam 20 clears the guide 12 and the latter is swung inward at its lower end by means of a contractile helical spring 21 and a moment thereafter the cam 18 clears the roller 17, whereby the cutting mechanism comes into play. A pulley 22 is fast to one end of the shaft 19 and a drive belt 23 cooperates therewith.

For convenience, an electric motor 24 is illustrated as means for operating the machine. The motor 24 is mounted upon the framework 1 and a drive belt 25 connects the same with a pulley 26 fast to a transverse shaft 27. Belt pulleys 28 and 29 are loose on the shaft 27 and are provided upon their opposing sides with shaft clutches adapted to cooperate with a clutch member 30 splined to the shaft 27 and operable by means of a lever 31. The pulley 28 is of less diameter than the pulley 29 and operates to drive the operating parts forwardly. The larger pulley 29 is the reverse and operates to quickly return the follower 4 to normal position when it is required to replenish the mold after all the material has been expelled therefrom. A contractile helical spring 32 normally acts to hold the clutch member 30 in engagement with the pulley 28. A rod 33 connected to the lever 31 provides convenient means for disengaging the clutch member 30 from the pulley 28 and holding it in engagement with the pulley 29 during the return of the follower 4 to normal position. A shaft 34, provided with pulleys 35 and 36, has the pulley 36 connected by means of a drive belt 37 with the reverse pulley 29 and the pulley 35 is connected by means of drive belt 38 with the pulley 9. A shaft 39 provided with pulleys 40 and 41, has the pulley 40 connected by means of a drive belt 42 with the pulley 28 and the pulley 41 is connected by means of a drive belt 43 with a pulley 44 having a cone 45 rotatable therewith. A drive belt 46 connects the cone pulley 45 with a companion cone pulley 47 with which the pulley 48 is connected and which pulley receives the drive belt 23. The companion cone pulleys 45 and 47 and the cooperating drive belt 46 provide means for varying the action of the cutting mechanism proportionately to the feeding mechanism, whereby to vary the sizes of the pieces of candy to be formed. A cone pulley 49 is rotatable with the shaft 39 and a drive belt 50 connects it with a companion cone pulley 51 fast to a shaft 52 which is provided with a pulley 53 which is connected by means of a crossed belt 54 with the pulley 10, whereby to advance the follower whereby to regulate the feed of the candy to be cut.

It is to be understood that the mold or casing 2 may be provided with any number of outlets 3 which may be of any size or shape required. The size of the pieces to be formed may be regulated by shifting the drive belts 46 and 50 which may be effected in any convenient way, said belts being maintained in the required adjusted position. The mold 2 may be supplied with cream, fondant or other desired filler or candy of a nature to be forced therefrom through the outlet by the action of the follower 4. The pieces cut by the machine may be conveyed to a chocolate enrober or finished in any desired way to meet existing demands. When it is required to replenish the mold, the lever 10$^c$ is operable to disengage clutch 10$^b$ from teeth 10$^a$ and lever 31 is operated to shift the clutch member 30 from the pulley 28 into engagement with the pulley 29, thereby effecting a reverse of the follower 4 and throwing the cutting and feeding mechanisms out of action.

What is claimed is:

1. In a candy cutting machine, means to continuously advance the candy, a guide pivotally mounted at the delivery end of said advancing means, a cutting mechanism slidably mounted on said guide, a shaft, and cams operated by said shaft, one of said cams controlling the position of the guide and cutting mechanism relatively to the advancing candy, and another cam controlling the position of the cutting mechanism relatively to said guide.

2. In a candy cutting machine, feed mechanism for continuously advancing the candy substantially horizontally, an upstanding frame, a guide pivoted adjacent the top to said frame, a cam on said frame for moving the guide in one direction and maintaining the same in the adjusted position for a predetermined interval, a spring connected to the guide and frame for quickly returning the guide to normal position, and a cutting mechanism carried by and movable up and down along the guide for severing the candy into pieces of required size.

3. In a candy cutting machine, a cutting means, a movable frame along which said cutting means is movable with respect to the candy, a cam to lift said cutting means after a cutting operation, and a cam to move the frame away from and maintain the cutting means out of interfering engagement with candy being fed upon the lifting movement of the cutting means.

4. In a candy cutting machine, a cutting means, a movable frame along which said cutting means is movable with respect to the candy, a cam to lift said cutting means after a cutting operation, a cam to move the frame away from and maintain the cutting means out of interfering engagement with candy being fed upon the lifting movement of the cutting means, uprights to which said guide frame is pivoted, a driven shaft mounted by said uprights, and said cams being disposed on said shaft.

5. In a candy cutting machine, a cutting means, uprights, a guide frame along which said means is movable with respect to the candy, said frame being disposed intermediate and pivoted to the uprights to normally hang vertical, a shaft journaled by said uprights, a weight to actuate the cutter, a spring to draw the frame toward the vertical, a cam on said shaft to elevate said cutting means after a cutting operation, and a cam on said shaft to move the frame away from and maintain the cutting means out of interfering engagement with candy upon the lifting of the cutting means.

In testimony whereof I affix my signature.

LEON G. HAMLIN.